United States Patent
Bondarenko

(10) Patent No.: US 10,060,223 B2
(45) Date of Patent: Aug. 28, 2018

(54) ENDOTHERMIC HEAT SINK FOR DOWNHOLE TOOLS

(71) Applicant: Halliburton Energy Services, Inc., Houston, TX (US)

(72) Inventor: Oleg Bondarenko, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 152 days.

(21) Appl. No.: 14/905,271

(22) PCT Filed: Sep. 9, 2013

(86) PCT No.: PCT/US2013/058800
§ 371 (c)(1),
(2) Date: Jan. 14, 2016

(87) PCT Pub. No.: WO2015/034537
PCT Pub. Date: Mar. 12, 2015

(65) Prior Publication Data
US 2016/0160609 A1 Jun. 9, 2016

(51) Int. Cl.
*E21B 36/00* (2006.01)
*E21B 47/01* (2012.01)
*E21B 47/06* (2012.01)
*C09K 5/18* (2006.01)

(52) U.S. Cl.
CPC .............. *E21B 36/001* (2013.01); *C09K 5/18* (2013.01); *E21B 47/011* (2013.01); *E21B 47/065* (2013.01)

(58) Field of Classification Search
CPC ......... E21B 36/00; E21B 36/001; E21B 47/01

USPC .................................................. 166/302, 57
See application file for complete search history.

(56) References Cited

U.S. PATENT DOCUMENTS

| | | |
|---|---|---|
| 3,067,594 A | 12/1962 | Bland et al. |
| 3,790,486 A | 2/1974 | Saltman et al. |
| 4,081,256 A | 3/1978 | Donnelly |
| 4,402,915 A * | 9/1983 | Nishizaki .............. C01B 3/0005 165/104.12 |
| 4,559,790 A * | 12/1985 | Houston ................ E21B 36/003 165/104.21 |
| 5,184,470 A | 2/1993 | Moser et al. |
| 5,257,755 A | 11/1993 | Moser et al. |
| 5,271,239 A | 12/1993 | Rockenfeller et al. |
| 5,396,775 A | 3/1995 | Rockenfeller et al. |
| 5,697,218 A | 12/1997 | Shnell |
| 8,820,397 B2 * | 9/2014 | Marzouk ............... E21B 36/001 166/302 |

(Continued)

FOREIGN PATENT DOCUMENTS

WO 2010068898 A2 6/2010
WO 2010129262 A2 11/2010

OTHER PUBLICATIONS

International Search Report and Written Opinion dated Jun. 3, 2014 for PCT Application No. PCT/US2013/058800 filed on Sep. 9, 2013 (13 pages).

*Primary Examiner* — Kenneth L Thompson
(74) *Attorney, Agent, or Firm* — Chamberlain Hrdlicka

(57) ABSTRACT

A downhole well tool with temperature sensitive components and one or more endo thermic cooling devices associated with the components. The cooling devices comprise at least two reactants isolated by a separator that is actuated to mix the reactants upon the components experiencing a temperature above a set limit.

19 Claims, 2 Drawing Sheets

(56) References Cited

U.S. PATENT DOCUMENTS

| | | | | |
|---|---|---|---|---|
| 8,826,984 | B2* | 9/2014 | Sanderlin | E21B 47/011 |
| | | | | 166/302 |
| 9,617,827 | B2* | 4/2017 | Marzouk | E21B 36/001 |
| 9,617,828 | B2* | 4/2017 | Marzouk | E21B 36/001 |
| 9,657,551 | B2* | 5/2017 | Marzouk | E21B 36/001 |
| 2002/0064692 | A1* | 5/2002 | Johnson | H01M 4/383 |
| | | | | 429/11 |
| 2005/0151555 | A1 | 7/2005 | Lewis et al. | |
| 2009/0297895 | A1 | 12/2009 | McLean et al. | |
| 2010/0147523 | A1 | 6/2010 | Difoggio | |
| 2012/0138848 | A1 | 6/2012 | Leavitt | |
| 2015/0345254 | A1* | 12/2015 | Ciglenec | E21B 47/011 |
| | | | | 166/302 |

\* cited by examiner

ENDOTHERMIC HEAT SINK FOR DOWNHOLE TOOLS

CROSS REFERENCE TO RELATED APPLICATIONS

None.

BACKGROUND

Technical Field

Exploration for and production of hydrocarbons from subterranean formations using downhole well tools and sensors.

Background Art

In hydrocarbon exploration and production operations, boreholes are drilled into the earth to depths where high pressure and high temperature conditions exist. Various tools and devices are used to measure various properties and conditions in the bore and include sensors for determining temperature, pressure and the presence of hydrocarbons.

Various downhole environmental influences, such as heat and pressure, put significant stress on components of exploration and/or production tools. For example, downhole temperatures may exceed the maximum temperature capacity of some components of the tools. In addition, sensors and other electronics units may generate heat. Such heat generated by the tools and/or the formation pose a significant risk of overheating. Accordingly, cooling techniques can be used to control the temperature of components in downhole tools to reduce or prevent degradation or deformation which could lead to tool failure and/or reduce the effective operating life and accuracy of the components.

BRIEF SUMMARY OF THE INVENTION

A system for controlling a temperature of a downhole component includes: a cooling device in thermal communication with the downhole component. The cooling device comprising containers housing the reactants of an endothermic reaction, the device configured to mix the reactants to initiate an endothermic reaction at a selected wellbore temperature and cool the component by absorbing heat from the downhole component.

A method of controlling a temperature of a downhole component includes: disposing a cooling device with endothermic reactants in containers that are in thermal communication with the component. Disposing the downhole component in a borehole in an earth formation and exposing the device to a selected temperature and thereafter mixing the reactants to cause an endothermic reaction to absorb heat from the downhole component.

BRIEF DESCRIPTION OF THE DRAWINGS

The drawing is incorporated into and forms a part of the specification to illustrate at least one embodiment and example of the present invention. Together with the written description, the drawing serves to explain the principles of the invention. The drawing is only for the purpose of illustrating at least one preferred example of at least one embodiment of the invention and is not to be construed as limiting the invention to only the illustrated and described example or examples. The various advantages and features of the various embodiments of the present invention will be apparent from a consideration of the drawing in which.

DETAILED DESCRIPTION

The present invention provides an improved apparatus and method for cooling a downhole component. The present invention's particular applicability is to sensitive downhole tools having electronic components.

Figure 1:
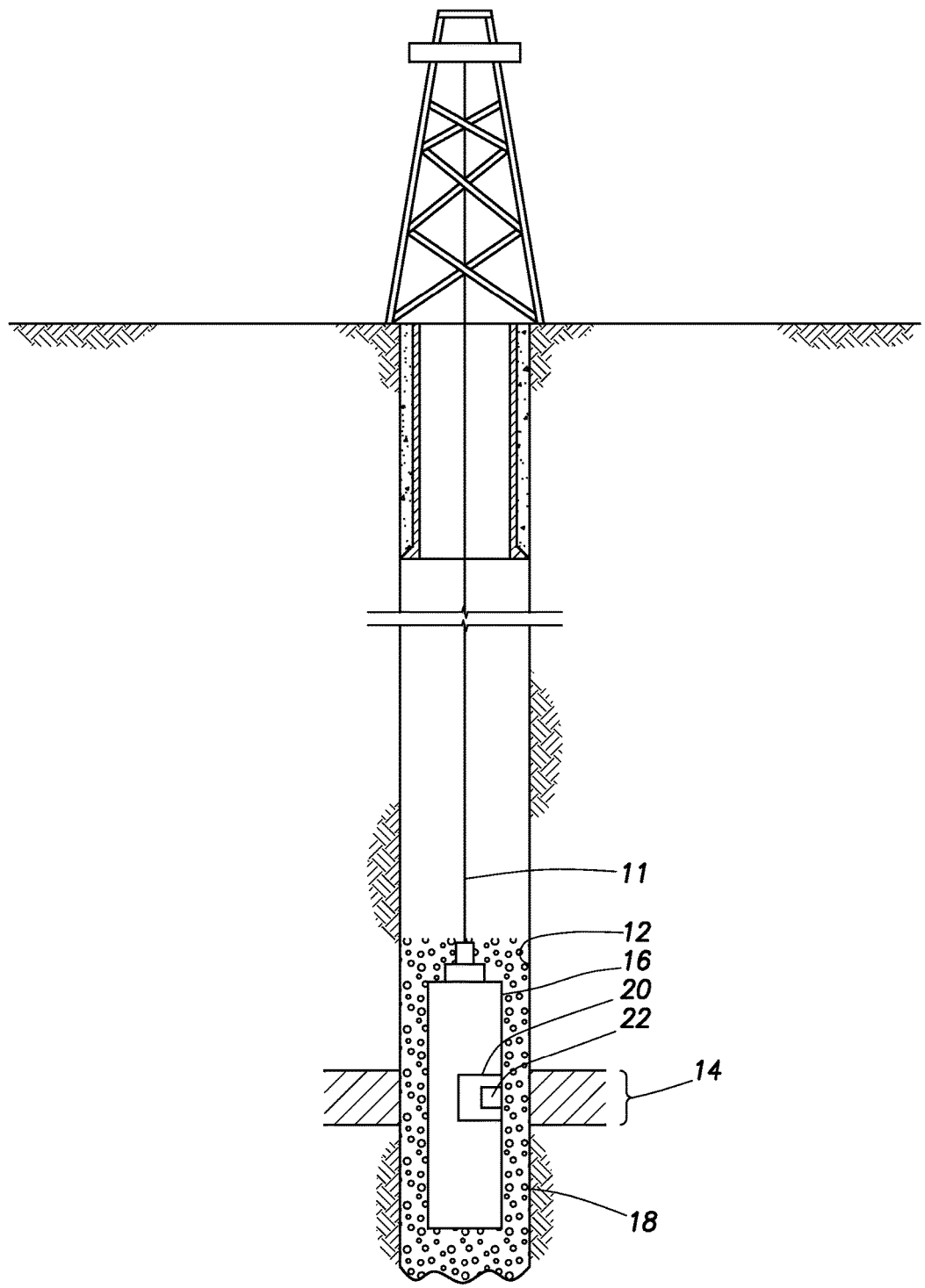
FIG. 1 is a diagram of a well tool of the present invention illustrated at a subterranean location in wellbore.

Referring more particularly to the drawings, FIG. 1 illustrates an exemplary embodiment of a well logging, production and/or drilling system 10 includes a wireline 11 that is shown disposed in a borehole 12 that penetrates at least one earth formation 14 during a drilling, well logging, testing, completion and/or hydrocarbon production operations. Although, for description purposes, wireline string 11 was selected to describe one embodiment of the invention, other systems for supporting a tool in a well could be used to support the tool in the well, such as, slick line, jointed tubing or coiled tubing. The well system 10 includes a downhole well tool 16. A borehole fluid 18 such as a drilling or completion fluid or drilling mud may be present in the borehole 12. In one embodiment, the downhole tool 16 is a well logging apparatus for surveying the production characteristics of the formations 14 intersected by the wellbore. In all embodiments, downhole tool 16 comprises temperature sensitive components 20, typically electrically operated or controlled but includes mechanically operated and controlled.

As described herein, "borehole" or "wellbore" refers to a single hole that makes up all or part of a drilled well. As described herein, "formations" refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area) including the fluids contained therein. Furthermore, the term "well tool" is used to describe any of the various drilling, completion and service tools that may also be inserted in a borehole or wellbore. The term "well tool component" is used to describe any part of a well tool, such as, an electrical circuit, an electrically powered device, a transducer with and electrical output, pneumatic or hydraulic circuits and devices and reacting chemicals or materials. The term "temperature sensitive component" of a well tool is use to describe a component whose performance is effected by temperatures elevated above ambient surface temperatures.

According to the present invention, well tool 16 comprises a temperature sensitive component 20 and a cooling device 22. The cooling device 22 is mounted in contact or thermal communication with the component 20. In high temperature wells the ambient hydrocarbon or formation temperature at subterranean locations can be in the range of 250° to 350° F. or higher. If the component 20 is electrical, the component itself can generate heat. Accordingly, the well fluid 18 at that high temperature subterranean location can be the same high temperatures. The components in some well tools either do not function reliably at these temperatures. As will be described, the cooling device 22 includes temperature sensing means and when the wellbore fluid 18 temperature and/or the component 20 temperature exceeds a set minimum the cooling device 22 is actuated to absorb heat from the component 20 to lower its temperature. The cooling device 22 utilizes and endothermic reaction to create a cooling effect.

Figure 2:
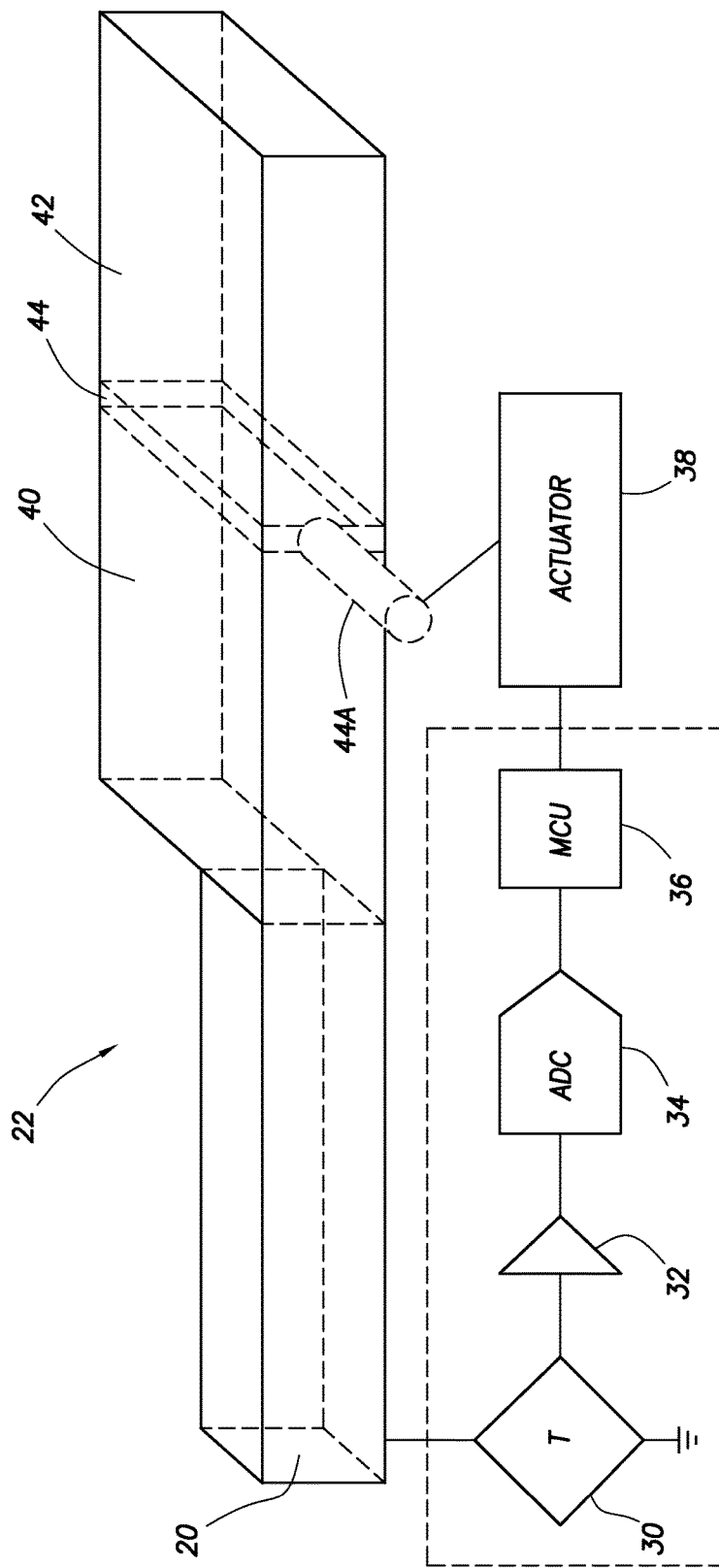
FIG. 2 is a schematic diagram of the endothermic device of the present invention.

Turning now to FIG. 2 the details of one embodiment of a cooling device 22 will be described. A circuit is illustrated comprising a temperature sensor 30, an amplifier 32, a signal analog to digital converter 34, a microcontroller (MCU) 36 and a mechanical actuator 38. In this embodiment the temperature sensor 30 measures the temperature of the component 20, or in another embodiment the temperature sensor 30 measures the ambient wellbore 12 temperature (wellbore fluid 18 temperature).

The signal from the temperature sensor 30 is amplified and converted into a readable format and provided to the microcontroller 36. The microcontroller 36 is programmed to operate the actuator 38 when the temperature sensed by sensor 30 exceeds a threshold. The temperature sensor 30 whose value is sampled by the analog-to-digital convertor 34 and read by a microcontroller 36. The MCU reads the temperature value periodically and when the temperature value reaches a preset threshold value the MCU enables an actuator. In this case the actuator can be an electrical motor that rotates the ball valve (separator) 90 degrees and initiates the solution. As used herein, an actuator is a device that converts electrical energy to mechanical movement.

At least two reactants of an endothermic reaction are enclosed in separate containers 40 and 42. For purposes of description only two reactant containers are illustrated, but it is envisioned that more than two could be present. The contents (reactants) in the containers 40 and 42 are isolated from each other by a separator 44 that is operably associated with the actuator 38. When the reactants are in contact with each other or mixed together an endothermic chemical reaction occurs. Containers 40 and 42 are preferably in thermal contact with component 20.

In one example separator 44 is a ball or gate valve that is opened to allow the reactants in the containers to flow together. In this embodiment the containers 40 and 42 are separate containers. The valve element separates the reactants in the two containers and when actuator 42A (solenoid) slides or rotates the valve element to the open position, the reactants are no longer isolated and interact to cause an endothermic reaction and cooling of the component 20.

In another example, cooler 22 comprises a single container divided into two chambers by a membrane. To initiate the endothermic reaction the membrane is pierced or broken by the actuator 38 to allow the reactants to contact each other.

In a further example, the container is mounted in the tool 16 with one reactant located above (in the direction of gravity) the other; so that, when the valve is opened or the diaphragm is pierced the reactants will flow into contact. For example, when the reactants are NaCl and $H_2O$, the water container is placed so that gravity will cause the water to flow into the container containing the salt when actuator removes the separation.

In an even further example, one or more of the reactants are maintained in the container at a higher pressure than the other reactants, whereby, the pressure differential assists in mixing once the separator is removed.

In operation, when the temperature measured by temperature sensor 30 exceeds a preset temperature the actuator opens the valve or pierces the membrane that act as separator 44 allowing the reactants to mix and cause a endothermic reaction cooling component 20.

Examples of endothermic reactions include: dissolving or mixing a salt in water: reacting barium hydroxide octahydrate crystals with dry ammonium chloride; dissolving ammonium chloride in water; reacting thionyl chloride (SOCl2) with cobalt(II) sulfate heptahydrate; mixing water and ammonium nitrate; mixing water with potassium chloride; and reacting ethanoic acid with sodium carbonate.

In operation, a well tool 16 having a temperature sensitive component 20 is assembled with the cooling device 22 of the present invention in thermal contact with the component 20. The microcontroller 36 is programmed to operate actuator upon the tool experiencing a set temperature. The tool is placed in the well and if and when a temperature exceeds the set temperature, the actuator operates the separator to mix the reactants in containers 42 and 44 and cause an endothermic reaction to cool component 20.

It is envisioned that a plurality of cooling devices 22 could be included in the tool and mounted in thermal contact with one or more components. Cooling devices 22 could be actuated simultaneously or serially. Separate cooling devices 22 could be actuated at different set temperatures.

While compositions and methods are described in terms of "comprising," "containing," or "including" various components or steps, the compositions and methods also can "consist essentially of" or "consist of" the various components and steps. As used herein, the words "comprise," "have," "include," and all grammatical variations thereof are each intended to have an open, non-limiting meaning that does not exclude additional elements or steps.

Therefore, the present inventions are well adapted to carry out the objects and attain the ends and advantages mentioned as well as those which are inherent therein. While the invention has been depicted, described, and is defined by reference to exemplary embodiments of the inventions, such a reference does not imply a limitation on the inventions, and no such limitation is to be inferred. The inventions are capable of considerable modification, alteration, and equivalents in form and function, as will occur to those ordinarily skilled in the pertinent arts and having the benefit of this disclosure. The depicted and described embodiments of the inventions are exemplary only, and are not exhaustive of the scope of the inventions. Consequently, the inventions are intended to be limited only by the spirit and scope of the appended claims, giving full cognizance to equivalents in all respects.

Also, the terms in the claims have their plain, ordinary meaning unless otherwise explicitly and clearly defined by the patentee. Moreover, the indefinite articles "a" or "an", as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A well tool for placing in a well at a subterranean location, the tool comprising:
   a component which functions to perform a task at a subterranean location in a well, the component is temperature sensitive and when exposed to a temperature in the well above set elevated temperature will not effectively perform the task; and
   a cooling device in thermal contact with the temperature sensitive component, the cooling device comprising temperature sensing means sensing the temperature of the temperature sensitive component, a plurality of reactants of the type which when mixed together cause an endothermic reaction, a separator isolating the reactants from each other as long as the temperature does not equal or exceed the set elevated temperature, wherein the separator is operably associated with an actuator.

2. The well tool according to claim 1, wherein the separator comprises a valve.

3. The well tool according to claim 1, wherein the separator comprises a diaphragm.

4. The well tool according to claim 1, wherein the plurality of reactants comprises a first reactant comprising salt and a second reactant comprising water.

5. The well tool according to claim 1, wherein the plurality of reactants comprises a first reactant comprising barium hydroxide octahydrate crystals and a second reactant comprising dry ammonium chloride.

6. The well tool according to claim 1, wherein the plurality of reactants comprises a first reactant comprising ammonium chloride and a second reactant comprising water.

7. The well tool according to claim 1, wherein the plurality of reactants comprises a first reactant comprising NaCl and a second reactant comprising water.

8. The well tool according to claim 1, wherein the plurality of reactants comprises a first reactant comprising thionyl chloride ($SOCl_2$) and a second reactant comprising cobalt(II) sulfate heptahydrate.

9. The well tool according to claim 1, wherein the plurality of reactants comprises a first reactant comprising potassium chloride and a second reactant comprising water.

10. The well tool according to claim 1, wherein the plurality of reactants comprises a first reactant comprising ammonium nitrate and a second reactant comprising water.

11. The well tool according to claim 1, wherein the plurality of reactants comprises a first reactant comprising ethanoic acid and a second reactant comprising sodium carbonate.

12. The well tool according to claim 1 additionally comprising a temperature sensing means senses a component temperature equal to or in excess of the set temperature.

13. A method of controlling a temperature of a downhole tool component comprising:
    mounting a cooling device in the tool in thermal communication with the component;
    placing in the cooling device a plurality of reactants in the which when combined create an endothermic reaction;
    separating the reactants in the cooling device, wherein the cooling device comprises a separator operably associated with an actuator;
    placing the downhole tool with her component and cooling device in a borehole at a subterranean location;
    monitoring the temperature of the component; and
    combining the reactants to cause an endothermic reaction to cool the downhole component when the monitored temperature reaches a set temperature.

14. The method of claim 13 wherein the separating step comprises placing the reactants in containers separated by the separator, wherein the separator is a closed valve.

15. The method of claim 14 wherein the combining step comprises opening the valve to place the reactants in chemical contact.

16. The method of claim 13 wherein the separating step comprises placing the reactants in containers separated by the separator, wherein the separator is a diaphragm.

17. The method of claim 16 wherein the combining step comprises piercing the diaphragm to place the reactants in chemical contact.

18. The method of claim 13 wherein the step of mounting a cooling device comprises mounting a plurality of cooling devices each set to combine endothermic reactants at different set temperatures.

19. A method of using a well tool to perform a function at a subterranean location in a well bore, the well tool having a component which when exposed to an elevated temperature in the subterranean well bore will malfunction, the method comprising:
    assembling a cooling device in thermal contact with the temperature sensitive component, placing in the cooling device a temperature sensing means sensing the temperature of the temperature sensitive component, placing in the cooling device a plurality of reactants the type which when mixed together cause an endothermic reaction, and separating the reactants from each other with a separator operably associated with an actuator;
    sensing the temperature of the component; and
    combining the reactive components to create a endothermic reaction to cool the component.

* * * * *